US011734153B2

United States Patent
O'Dell et al.

(10) Patent No.: US 11,734,153 B2
(45) Date of Patent: Aug. 22, 2023

(54) AUTOMATED DISCOVERY OF API ENDPOINTS FOR HEALTH CHECK AND AUTOMATED HEALTH CHECK GENERATION

(71) Applicant: salesforce.com, inc., San Francisco, CA (US)

(72) Inventors: Robert M. O'Dell, Seattle, WA (US); Nicolas Hernan Battiato, Buenos Aires (AR); Diego Gabriel Larralde, Buenos Aires (AR); Guido Agustin Martinez, Buenos Aires (AR); Christian Vallejos, Buenos Aires (AR); Maria Florencia Vimberg, Buenos Aires (AR); Eduardo Cominguez, Buenos Aires (AR); Ignacio Agustin Manzano, Buenos Aires (AR); Peter Gorski, Burlingame, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/479,518

(22) Filed: Sep. 20, 2021

(65) Prior Publication Data
US 2023/0093659 A1 Mar. 23, 2023

(51) Int. Cl.
G06F 3/00 (2006.01)
G06F 11/34 (2006.01)
G06F 9/54 (2006.01)

(52) U.S. Cl.
CPC ............ *G06F 11/3495* (2013.01); *G06F 9/54* (2013.01)

(58) Field of Classification Search
CPC .................................................. G06F 9/54
USPC ............................................................ 719/328
See application file for complete search history.

(56) References Cited

U.S. PATENT DOCUMENTS

| 10,579,372 | B1* | 3/2020 | Bahrami | G06K 9/6262 |
| 10,671,520 | B1* | 6/2020 | Rodrigues | H04L 41/0806 |
| 2009/0113067 | A1* | 4/2009 | Andreasen | H04L 61/2575 709/231 |
| 2016/0350539 | A1* | 12/2016 | Oberheide | H04L 63/20 |
| 2018/0091392 | A1* | 3/2018 | Richards | H04L 43/08 |

(Continued)

OTHER PUBLICATIONS

Nitin Sukhija, Event Management and Monitoring Framework for HPC Environments using ServiceNow and Prometheus. (Year: 2020).*

(Continued)

*Primary Examiner* — Lechi Truong
(74) *Attorney, Agent, or Firm* — Sterne, Kessler, Goldstein & Fox (57) ABSTRACT

Disclosed herein are system, method, and computer-readable medium embodiments for providing the ability to automate identification of endpoints of an API for potential health checks based on machine learning and/or similarity search algorithms. The algorithms analyze an API specification according to the algorithm's training and/or search among reference APIs. Rather than having to manually generate health check tests for the web service, a test developer can interact with a test service through a web browser and provide the service an API specification. The test service then can automatically rank identified endpoints according to a ranking system as well as automate health checks by automatically preparing the health check code according to each identified endpoint.

19 Claims, 5 Drawing Sheets

(56) References Cited

U.S. PATENT DOCUMENTS

2020/0250077 A1* 8/2020 Bregman ............... G06F 9/54
2020/0326913 A1* 10/2020 Ying ..................... G06F 8/74
2021/0216308 A1* 7/2021 Vyas ..................... G06N 20/00

OTHER PUBLICATIONS

Nikan Chavoshi, Identifying Correlated Bots in Twitter. (Year: 2016).*

Vinaydeep Kaur, Crowd-Sourcing based Android Application for Structural Health Monitoring and Data Analytics of Roads using Cloud Computing. (Year: 2017).*

* cited by examiner

AUTOMATED DISCOVERY OF API ENDPOINTS FOR HEALTH CHECK AND AUTOMATED HEALTH CHECK GENERATION

BACKGROUND

Representational state transfer (REST) web services (or, RESTful web services) are services satisfying several core principles of REST, such as the use of stateless operations, client-server relationships, and unique identification of resources through a uniform resource identifier (URI). Commonly, requests to these RESTful web services are made through Hypertext Transfer Protocol (HTTP) requests, that include instructions such as GET (to read a resource at a URI), PUT (to update a resource at the URI), DELETE (to remove a resource at the URI), and POST (to create a new resource).

These services may be developed and implemented in conformance with the use of an Application Program Interface (API). The API defines how requests are made and answered by the service. Developers can generate APIs through the use of API specifications, which in the context of RESTful web services are often defined in languages such as RESTful API Modeling Language (RAML) or OpenAPI Specification (OAS).

An endpoint of an API is an access point (e.g., a URL) through which a user can interact with the API (e.g., input and output flows). An API can include one or more endpoints. It is of interest for API developers to make sure APIs behave reliably so as to provide users reliable interaction with the API. To check an API, a developer can conduct tests at the endpoint (e.g., "health" checks).

Testing a RESTful web service API (REST API) is commonly handled by generating test suites, commonly with tools such as Apache JMeter, JUnit, or Blackbox API Tester (BAT). However, generating test suites with each of these tools requires manually defining test parameters and conditions.

Accordingly, what is needed are automated tools for testing REST APIs.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for rapid generation of test suites for verifying the operation of REST APIs.

In order to test REST APIs, a testing framework such as Apache JMeter (for example) may be used to write tests, as well as to compile multiple tests into a test suite. A testing framework allows for connection to a service, such as a RESTful web service, and the sending of requests to the service in order to receive a response. That response can then be tested against constraints to determine whether the response is or is not what was expected.

While REST API testing frameworks allow for robust implementation of tests and test suites, in some embodiments, a test developer is tasked with envisioning a plurality of testing scenarios and write the tests specific to a particular API. The developer is then tasked with drafting a test for each possible use case, specific for a particular API. And, if testing multiple APIs, this approach presents an exponentially complex problem for test development.

In some embodiments, APIs can be designed and generated through the use of an API specification, such as RAML or OAS by way of non-limiting example. A test developer can reference the API specification in order to determine which requests to make for testing purposes, and then apply certain constraints to the received responses in order to verify correct behavior. In some embodiments, a developer can implement a health check endpoint in an API. The term "health check endpoint" can be used herein to refer to endpoints-of-interest for potential health checking of an API. Systems like Istio or Kubernetes (non-limiting examples) can probe the API via the health check endpoint to determine whether the API is working or not. Providing a health check endpoint is an important feature of an API, as it allows health check systems (e.g., Kubernetes, Istio, Mulesoft's Anypoint Platform™, or the like) to determine if a corrective action is needed (e.g., scaling the API in the event of API malfunction).

In one scenario, according to some embodiments, a developer can have an early version of an API completed. At this stage of development, it can be appreciated that not many tests, if any, have been performed on the completed API. Therefore, despite the developer being the "creator" of the API, it may not be readily apparent to the developer which aspects of the API have a higher risk of malfunctioning or becoming unstable when the API is deployed for consumer use. In one example, such instability information can be gained by deploying the API and relying on user-feedback to guide the debugging/correction process. However, presenting a non-optimized product to customers is undesirable.

In some embodiments, to avoid a detrimental customer experience, the developer can instead perform their own test processes. For example, the developer, having knowledge of their own API, can analyze the API specification to make an educated guess on how to implement health check endpoints. The term "health check discovery," "health check endpoint discovery," or the like can be used herein to refer to such analysis. It is to be appreciated that the above-described scenario demonstrates a "manual" health check discovery. In contrast, a developer can use an algorithm to automate certain tasks in the health check discovery to reduce a burden on the developer—this can be referred to as "automated" health check discovery.

In some embodiments, the developer can generate one or more tests (e.g., a ping, simulation scenarios, or the like) to perform a health check on an endpoint of the API. It is to be appreciated that the developer generating the tests is engaging in "manual" health check generation. In contrast, a developer can use an algorithm to automate certain tasks in generating health checks to reduce a burden on the developer—this can be referred to as "automated" health check generation.

Embodiments disclosed herein provide structures and functions to allow automated health check endpoint discovery and automated health check generation.

Figure 1:
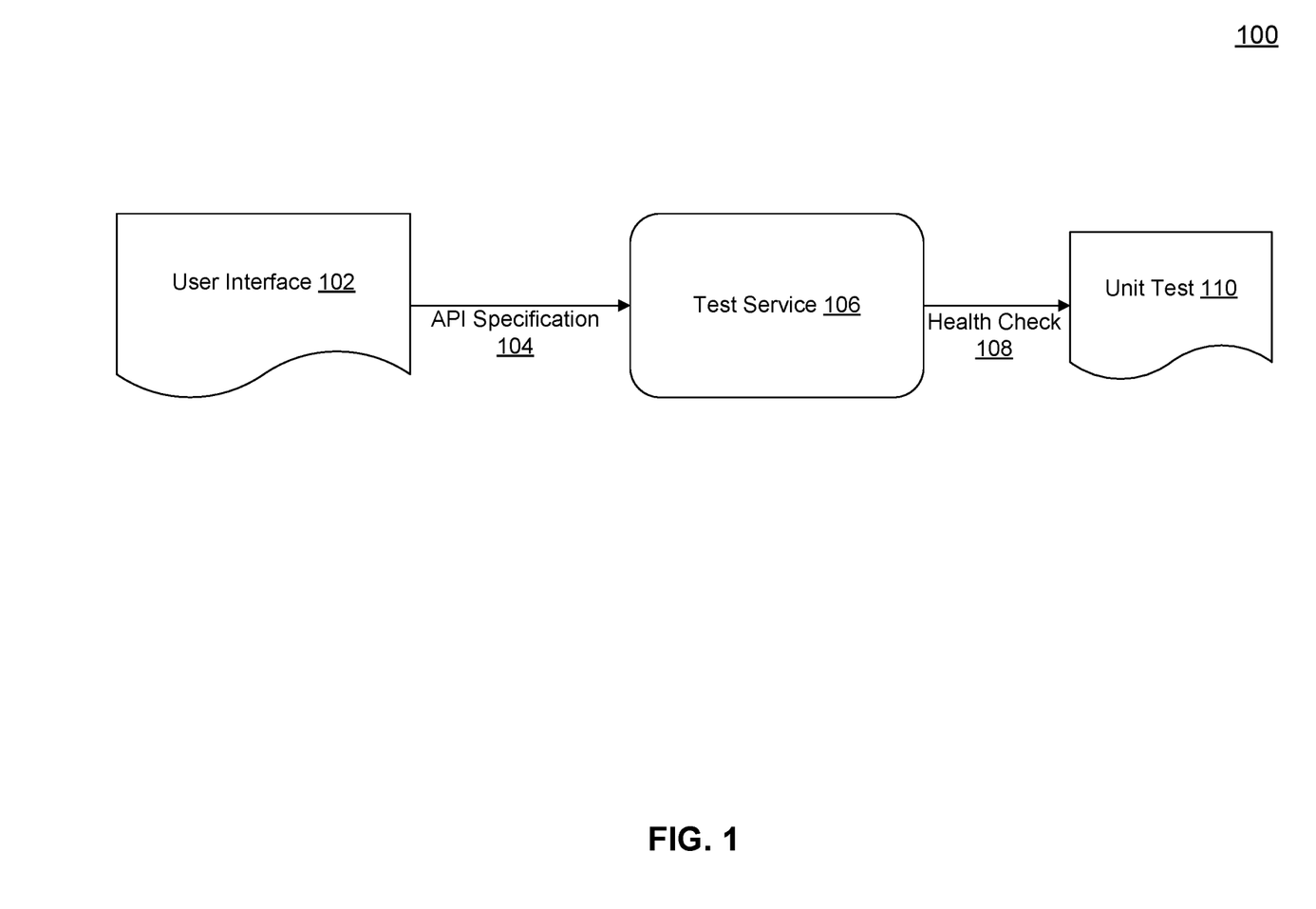
FIG. 1 shows a system for facilitating test suite generation, according to some embodiments.

FIG. 1 shows a system 100 for facilitating health check endpoint discovery and health check generation, according to some embodiments. System 100 can comprise a user interface 102, a test service 106, and a unit test 110. User interface 102 can be a graphical user interface (e.g., a web browser), a command-line interface (CLI), or the like. User interface 102 can interact with one or more services (e.g., a REST API, test service 106, or the like). User interface 102, test service 106, and unit test 110 can be implemented using one or more computing devices (e.g., a personal computer, a mobile device, a server, or the like).

In some embodiments, a developer at user interface 102 can send an API specification 104 to test service 106. API specification can comprise, for example, architecture of the API (metadata can also be included). Test service 106 can analyze the API specification 104. Based on the analysis, test service 106 can determine one or more health check endpoints for potential implementation in the API (i.e., automated health check endpoint discovery). Particularly, test service 106 can determine a relevance value for one or more of the endpoints. The relevance value can be based on, for example, a probability value of the discovered health check endpoint being actually relevant to the developer. The relevance value can be an algorithm-predicted value that is based on the analysis performed by test service 106. The endpoints can be arranged by ranking (e.g., from most relevant to least relevant).

In some embodiments, test service 106 can generate (or prepare to generate) one or more executable health checks (e.g., tests) to go along with one or more of the discovered health check endpoints. In a preparatory stage of generating the tests, test service 106 can wait for user input to specifically generate a subset of tests from the suite of possible tests. For example, a developer can provide user input by selecting one or more of the discovered health check endpoints to proceed with. In this manner, test service 106 can perform automated health check generation. The generated health check(s) 108 can then be provided as a unit test 110 (and modified as needed) for testing the API by probing the health check endpoints. The arrows are not intended to limit interaction directions as one way. For example, test service 106 may return outputs back to a user at user interface 102. A suite of tests saved in unit test 110 may be presented to a user at user interface 102.

Figure 2:
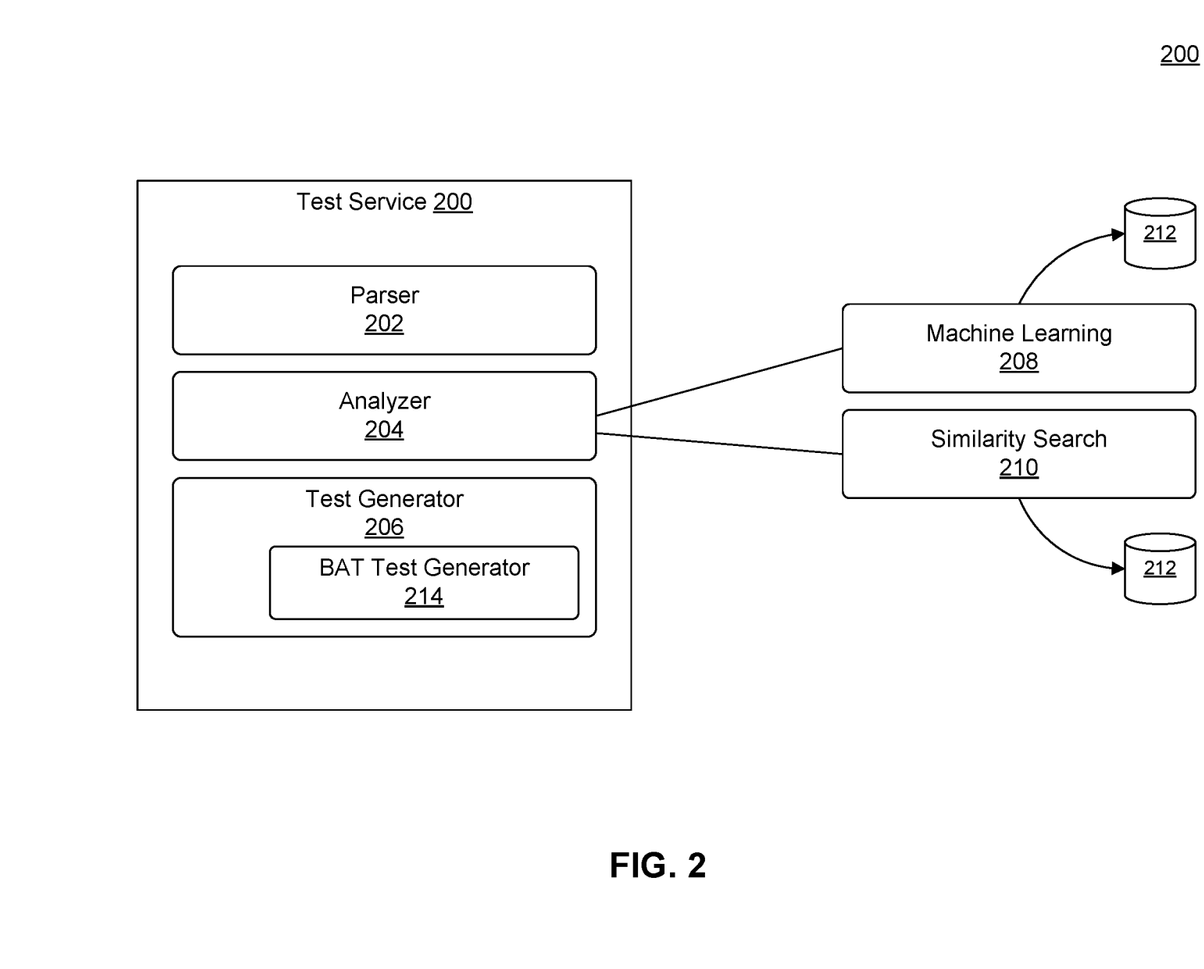
FIG. 2 shows a test service, according to some embodiments.

FIG. 2 shows a test service 200, according to some embodiments. In some embodiments, test service 200 can be implemented as test service 106 in FIG. 1.

In some embodiments, test service 200 can comprise a parser 202, an analyzer 204, and a test generator 206 (or health check generator). Analyzer 204 can comprise an algorithm for analyzing APIs. Test generator 206 can comprise an algorithm for generating code for health checks and a library from which the health check code can be derived from. This architecture shows a specific modularization (non-limiting example) of test service 200 configured to perform the methods described herein, such as those illustrated in flowcharts 300 (FIG. 3) and 400 (FIG. 4).

In some embodiments, test service 200 can receive an API specification 104 (FIG. 1). Test service 200 can also receive metadata, such as historical user inputs (e.g., user selections). The API specification can be parsed through parser 202 for subsequent analysis by analyzer 204. With a parsed API specification, analyzer 204 can employ algorithm(s) to identify endpoints that would be exposed when the API is deployed.

In some embodiments, analyzer 204 can comprise a machine learning algorithm 208. Machine learning algorithm 208 can comprise a regression, decision tree, support vector machine (SVM), k-nearest neighbors, naïve Bayes, or the like—to name a few as non-limiting examples. In order to identify endpoints, from an API specification, for health check relevance, machine learning algorithm 208 can be trained prior to being used on an API. The training method can be to have machine learning algorithm 208 analyze known APIs that have known results. Here, the terms "known APIs", "reference APIs", "training APIs", or the like, can refer to APIs that have a track record of observed behavior and known results can refer to endpoints that have a track record of being preferred health check endpoints as historically selected by previous users (e.g., reference metadata).

In some embodiments, after machine learning algorithm 208 is trained, test service 200 can be used on APIs that machine learning algorithm 208 has yet to confront. Machine learning algorithm 208 can analyze the input (unknown) API specification by comparing the input API to what machine learning algorithm 208 has learned from the reference APIs and reference metadata. In this sense, it can be said that machine learning algorithm 208 can compare the input API specification to the reference APIs and reference metadata. Then, machine learning algorithm 208 can identify potential health check endpoints of the API being analyzed based on the health check endpoints historically preferred for the reference APIs (i.e., based on the reference metadata).

In some embodiments, analyzer 204 can comprise a similarity search algorithm 210. Similarity search algorithm 210 can be implemented as an alternative, or in addition to, machine learning algorithm 208. Similarity search algorithm 210 can be implemented so as to have access to a collection of different, reference APIs and corresponding reference metadata (e.g., a library). When test service 200 receives an API specification, similarity search algorithm 210 can conduct a search of reference APIs to identify one reference API that is relevant (e.g., most closely matches the input API specification). Then, similarity search algorithm 210 can identify potential health check endpoints of the API being analyzed based on the health check endpoints historically preferred for the most closely matched known API (e.g., reference metadata). In this sense, it can be said that similarity search algorithm 208 can compare the input API specification to the reference APIs and reference metadata.

In some embodiments, analyzer 204 can output an analyzer output 212. Analyzer output 212 can be, for example, identification of one or more potential endpoints of the analyzed API specification for health checking. Analyzer output 212 can be organized as a list of potential health check endpoints that for sending to user interface 102 (FIG. 1). The list of potential health check endpoints can also include relevance values for each of the listed endpoints—assigned by analyzer 204 based on the analysis of the API specification. The relevance value can be based on, for example, a probability value of the discovered health check endpoint being actually relevant to the developer. Analyzer 204 can determine the relevance value(s) based on at least the training of machine learning algorithm 208 and/or results from similarity search algorithm 210.

In some embodiments, test generator 206 can generate one or more executable health checks for the one or more potential health check endpoints that have been identified by analyzer 204. Test generator 206 can comprise a BAT test generator 214 for generating code for blackbox automated testing. Test generator 206 can generate a test in Apache JMeter, JUnit, or BAT format—to name a few as non-limiting examples. The generated one or more health checks can be based on the comparing of the specification of the API and the reference APIs and reference metadata. For example, analyzer 204 can determine that one or more potential health check endpoints from the specification of the API have a trend similar to endpoints in the reference APIs. The reference metadata can include information about historically preferred health check(s) used for endpoints in the reference APIs. Test generator 206 can generate the one or more executable health checks based on the information about historically preferred health check(s) for a given endpoint trend.

In some embodiments, test generator 206 can comprise or have access to a library of code for health checks—encompassing at least the historical health checks included in the reference metadata. Test generator 206 can act on the results of analyzer 204 and prebuild one or more health checks to go along with the one or more potential health check endpoints as determined by analyzer 204. The generated one or more health checks can be saved (e.g., as unit test 110 (FIG. 1)) for subsequent execution. The generated one or more health checks can be saved based on input from a user. For example, a developer can act on the list of endpoints in analyzer output 212 by making a selection(s) regarding which listed endpoints are relevant and/or which listed endpoints are not relevant for health checks.

In some embodiments, the generated one or more health checks can be executed based on an input from a user. The input can be, for example, a time schedule. The time schedule can specify when the generated one or more health checks can be executed (e.g., once, multiple times, on a periodic schedule, or the like).

In some embodiments, metadata relating to executed health checks can be logged for future use. For example, such logged metadata can include, without limitation, identification of the user that requested the execution of the health check(s), the results of executed the health check(s), the duration of executed health check(s), identification of endpoint(s) tested, identification of API(s) tested, corrective actions (if any) taken by a user based on results of executed health check(s), and the like. The logged metadata can be used by developers to enhance APIs at later development stages and/or enhance analyzer 204.

In some embodiments, one or more computing devices used for implementing test service 200 can send an alert at a conclusion of executed health check(s) (e.g., to alert a developer to check on the results). Additional metadata (e.g., as described above) may be sent along with the alert so as to inform a developer of the results of the health check(s).

In some embodiments, the determination of potential health check endpoints can be enhanced (e.g., reinforced) by incorporating results from test service 200 back into analyzer 204 (e.g., a feedback loop). The determination of potential health check endpoints and corresponding relevance values can be adjusted and enhanced by reinforcement (e.g., inputting metadata to the algorithms during actual use of test service 200, for example, user selection of a desired health check endpoint).

In some embodiments, by providing test service 200 with the capability to identify potential health check endpoints, and having knowledge of the API from the input specification, a skeleton of the health check(s) to go along with the identified endpoints can be generated as easily as browsing a website. Whereas previously a test developer would have had to envision failure modes of the API in order to manually create those test cases, the test developer (or other users) can use user interface 102 (FIG. 1) (e.g., a RESTful web service) as a normal user and put the web site through its paces with a few simple inputs. In interacting with the web site as a normal user, the test developer can rapidly prepare health checks for the API being developed.

Figure 3:
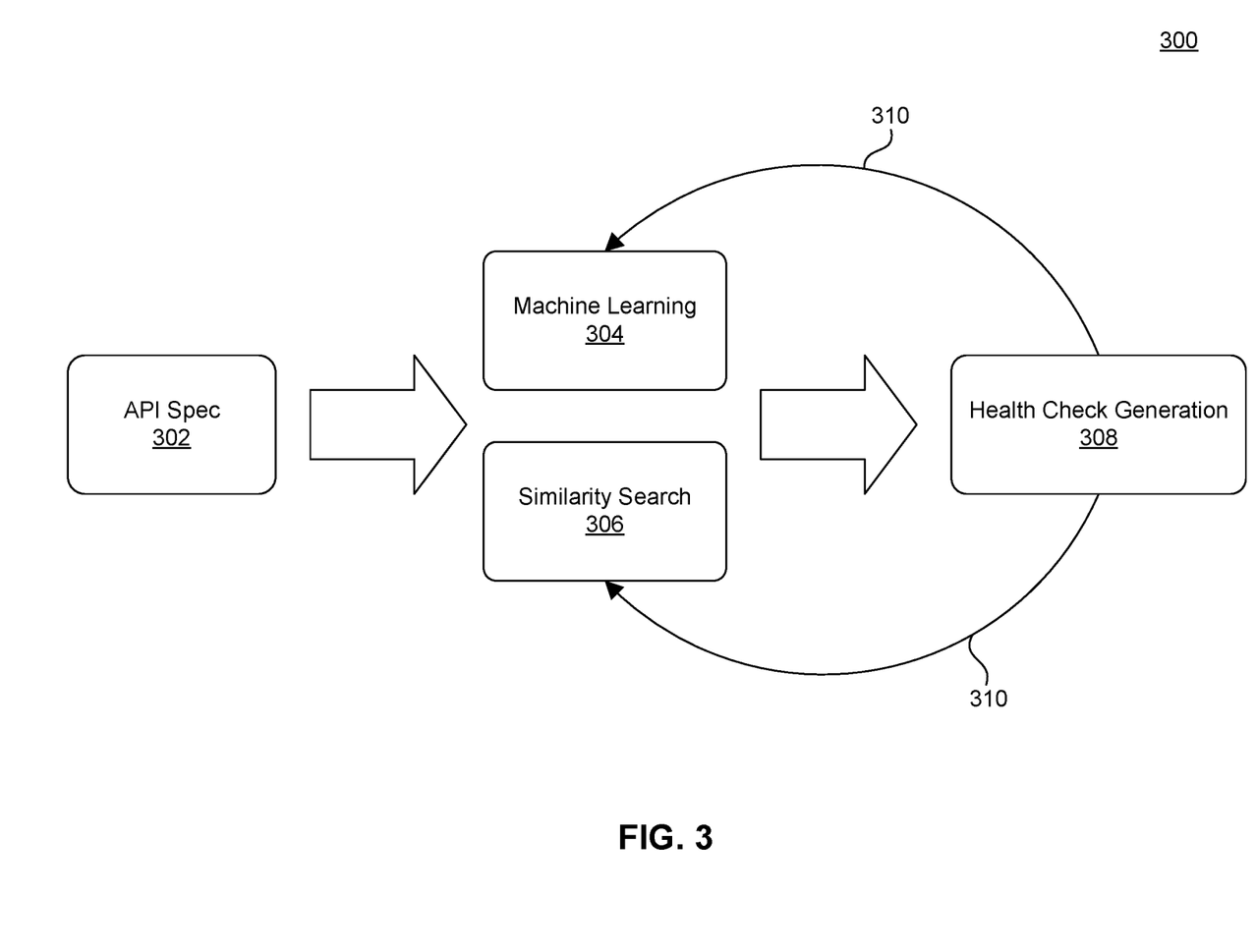
FIG. 3 shows a flowchart illustrating steps by which an automated health check generation scheme can be reinforced, according to some embodiments.
Figure 4:
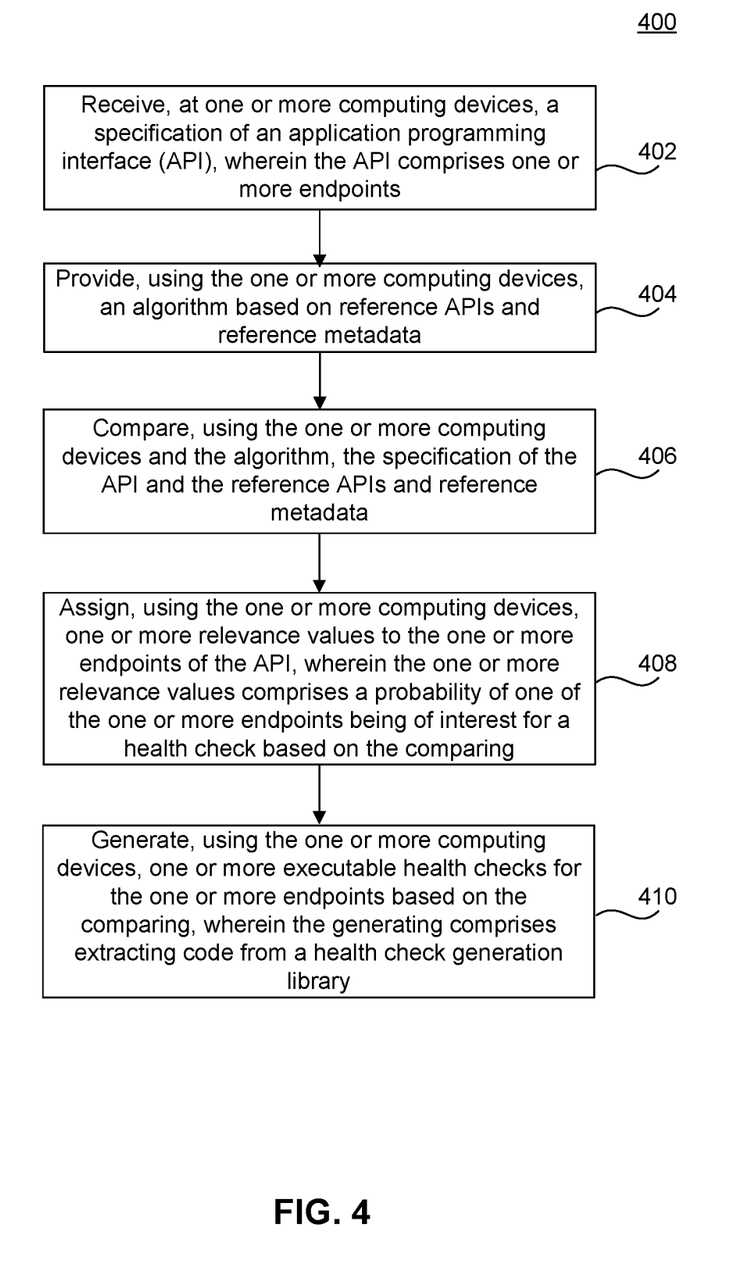
FIG. 4 shows a flowchart of a method, according to some embodiments.

FIG. 3 shows a flowchart 300 illustrating steps by which an automated health check generation scheme can be reinforced, according to some embodiments. At step 302, an API specification is provided to an analyzer (e.g., analyzer 204 (FIG. 2)). At step 304, a machine learning algorithm of the analyzer can analyze the API specification as described above in reference to machine learning algorithm 208 (FIG. 2). Alternatively, or additionally, at step 306, a similarity search algorithm of the analyzer can analyze the API specification as described above in reference to similarity search algorithm 210 (FIG. 2). At this stage of analysis, one or more endpoints for potential health checks can be determined and assigned relevance values. At step 308, a test generator can act on the results of the analysis and generate one or more health checks to go along with the one or more potential health check endpoints as determined by the previously described analysis.

In some embodiments, at step 310, the system executing the functions in flowchart 300 may present a user a list of suggested endpoints for health checking along with corresponding relevance values. The user may input a selection into the system that indicates relevance and/or non-relevance of one or more of the suggested potential endpoints for health checking. The selection, or user input, may be used to inform the machine learning algorithm and/or the similarity search algorithm, forming a feedback loop. As more and more selection are made by more and more users, the selections reinforce the algorithms to improve the relevance values in future determinations of potential endpoints for health checks. Previously, the functions of an analyzer was described as comparing an input API to what an algorithm 208 has learned from the reference APIs and reference metadata. In this context, step 310 may also be described as reinforcing the previously mentioned comparing, the reinforcing being based on the user input.

FIG. 4 shows method steps for performing functions as described in reference to FIGS. 1-3 and 5, according to some embodiments. At step 402, a specification of an API can be received at one or more computing devices. The API can comprise one or more endpoints. At step 404, an algorithm based on reference APIs and reference metadata can be provided using the one or more computing devices. At step 406, the specification of the API and the reference APIs and reference metadata can be compared using the one or more computing devices. At step 408, one or more relevance values can be assigned to the one or more endpoints of the API using the one or more computing devices. The one or more relevance values comprises a probability of one of the one or more endpoints being of interest for a health check based on the comparing. At step 410, one or more executable health checks for the one or more endpoints can be generated based on the comparing. The generating can comprise extracting code from a health check generation library.

The method steps of FIGS. 3 and 4 may be performed in any conceivable order and it is not required that all steps be performed. Moreover, the method steps of FIGS. 3 and 4 described above merely reflect an example of steps and are not limiting. It is to be appreciated that further method steps are envisaged based upon functions described in embodiments referencing FIGS. 1, 2, and 5.

Figure 5:
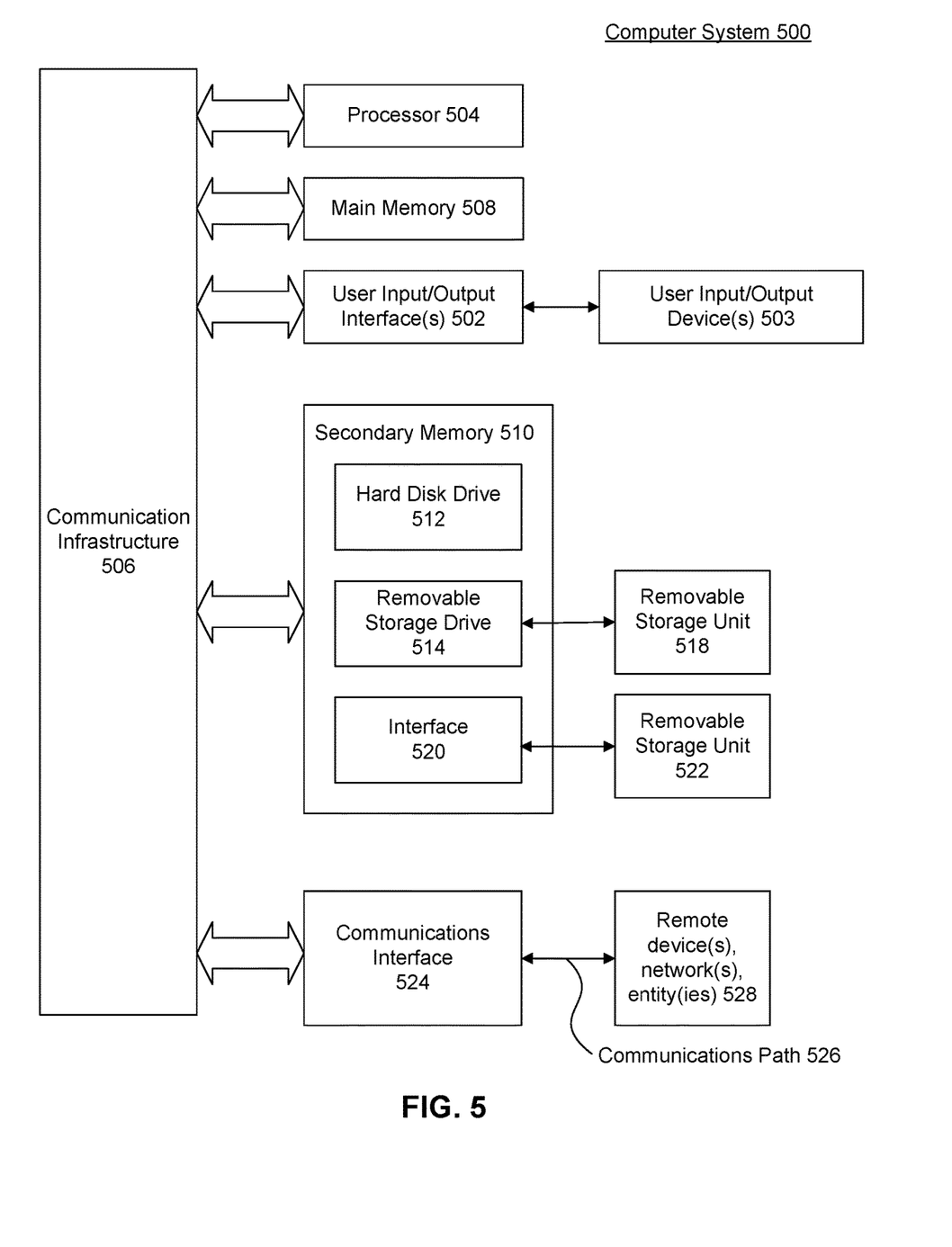
FIG. 5 show an example computer system useful for implementing various embodiments.

Various embodiments can be implemented, for example, using one or more well-known computer systems, such as computer system 500 shown in FIG. 5. One or more computer systems 500 can be used, for example, to implement any of the embodiments discussed herein, as well as combinations and sub-combinations thereof.

Computer system 500 can include one or more processors (also called central processing units, or CPUs), such as a processor 504. Processor 504 can be connected to a communication infrastructure or bus 506.

Computer system 500 can also include customer input/output device(s) 503, such as monitors, keyboards, pointing devices, etc., which can communicate with communication infrastructure 506 through customer input/output interface(s) 502.

One or more of processors 504 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 can also include a main or primary memory 508, such as random access memory (RAM). Main memory 508 can include one or more levels of cache. Main memory 508 can have stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 can include a computer usable or readable storage device having stored thereon computer software (control logic) and/or data. Removable storage unit 518 can be a floppy disk, magnetic tape, compact disk, DVD, optical storage disk, and/any other computer data storage device. Removable storage drive 514 can read from and/or write to removable storage unit 518.

Secondary memory 510 can include other means, devices, components, instrumentalities or other approaches for allowing computer programs and/or other instructions and/or data to be accessed by computer system 500. Such means, devices, components, instrumentalities or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 can enable computer system 500 to communicate and interact with any combination of external devices, external networks, external entities, etc. (individually and collectively referenced by reference number 528). For example, communication interface 524 can allow computer system 500 to communicate with external or remote devices 528 over communications path 526, which can be wired and/or wireless (or a combination thereof), and which can include any combination of LANs, WANs, the Internet, etc. Control logic and/or data can be transmitted to and from computer system 500 via communication path 526.

Computer system 500 can also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

In some embodiments, a tangible, non-transitory apparatus or article of manufacture comprising a tangible, non-transitory computer useable or readable medium having control logic (software) stored thereon can also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), can cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
comparing, by one or more computing devices using an algorithm based on reference application programming interfaces (APIs) and reference metadata, a specification of a target application programming interface (API) and the reference APIs and reference meta data, wherein the algorithm is a machine learning algorithm, wherein the target API comprises an endpoint, and wherein the reference metadata comprises historical reference about instability of endpoints of the reference APIs;
assigning, by the one or more computing devices and based on the comparing, a relevance value to the endpoint of the target API, wherein the relevance value indicates a probability of the endpoint of the target API being of interest for a health check according to the historical reference about instability;
determining, by the one or more computing devices, the endpoint of the target API as being of interest for a health check using the machine learning algorithm, wherein the machine learning algorithm is trained using training APIs from the reference APIs; and
generating, by the one or more computing devices and based on the relevance value and the determining, an executable health check for the endpoint of the target API, wherein the executable health check comprises code extracted from a health check generation library.

2. The computer-implemented method of claim 1, further comprising reinforcing, by the one or more computing devices, the algorithm based on further metadata.

3. The computer-implemented method of claim 2, wherein:
the further metadata is based on the generated executable health checks; and
the reinforcing comprises reinforcing the algorithm based on the generated executable health checks.

4. The computer-implemented method of claim 2, further comprising receiving, by the one or more computing devices, input from a user, wherein:
the input comprises an indication of a relevance of the endpoint of the target API as relating to a health check; and
the reinforcing comprises reinforcing the algorithm based on the input.

5. The computer-implemented method of claim 2, wherein the reinforcing comprises adjusting the relevance based on analyzing the further metadata.

6. The computer-implemented method of claim 1, further comprising training the machine training algorithm using the training APIs.

7. The computer-implemented method of claim 1, wherein the algorithm comprises a similarity search algorithm and the comparing comprises:
searching the reference APIs; and
determining one of the reference APIs as being relevant to the specification of the target API.

8. The computer-implemented method of claim 7, further comprising determining, by the one or more computing devices, the endpoint of the target API as being of interest for a health check based on the searching.

9. The computer-implemented method of claim 1, further comprising executing, by the one or more computing devices, the generated executable health check.

10. The computer-implemented method of claim 9, further comprising receiving, by the one or more computing devices, input from a user, wherein:
the input comprises a time schedule; and
the executing is based on the time schedule.

11. The computer-implemented method of claim 9, further comprising logging information relating to the executing.

12. The computer-implemented method of claim 9, further comprising sending, by the one or more computing devices, an alert indicating a completion of the executing.

13. The computer-implemented method of claim 1, further comprising receiving, by the one or more computing devices, input from a user, wherein:
the input comprises an indication of a relevance of the endpoint of the API as relating to a health check; and
the generating of the executable health check is further based on the input.

14. A non-transitory computer-readable medium having instructions stored thereon that, when executed by one or more computing devices, cause the one or more computing devices to perform operations comprising:
comparing, using an algorithm based on reference application programming interfaces (APIs) and reference metadata, a specification of a target application programming interface (API) and the reference APIs and reference metadata, wherein the algorithm is a machine learning algorithm, wherein the target API comprises an endpoint, and wherein the reference metadata comprises historical reference about instability of endpoints of the reference APIs;

assigning, based on the comparing, a relevance value to the endpoint of the target API, wherein the relevance value indicates a probability of the endpoint of the target API being of interest for a health check according to the historical reference about instability;

determining, by the one or more computing devices, the endpoint of the target API as being of interest for a health check using the machine learning algorithm, wherein the machine learning algorithm is trained using training APIs from the reference APIs; and generating, based on the relevance value and the determining, an executable health check for the endpoint of the target API, wherein the executable health check comprises code extracted from a health check generation library.

15. The non-transitory computer-readable medium of claim 14, wherein the operations further comprise reinforcing the algorithm based on further metadata.

16. The non-transitory computer-readable medium of claim 15, wherein:
the operations further comprise receiving input from a user;
the input comprises an indication of a relevance of the endpoint of the target API as relating to a health check; and
the reinforcing comprises reinforcing the algorithm based on the input.

17. The non-transitory computer-readable medium of claim 14, wherein the operations further comprise training the machine learning algorithm using the training APIs.

18. The non-transitory computer-readable medium of claim 14, wherein:
the algorithm comprises a similarity search algorithm; and
the comparing comprises:
searching the reference APIs; and
determining one of the reference APIs as being relevant to the specification of the target API.

19. A system comprising:
one or more computing devices; and
a non-transitory computer-readable medium having instructions stored thereon that, when executed by the one or more computing devices, cause the one or more computing devices to perform operations comprising:
comparing, using an algorithm based on reference application programming interfaces (APIs) and reference metadata, a specification of a target application programming interface (API) and the reference APIs and reference metadata, wherein the algorithm is a machine learning algorithm, wherein the target API comprises an endpoint, and wherein the reference metadata comprises historical reference about instability of endpoints of the reference APIs;
assigning, based on the comparing, a relevance value to the endpoint of the target API, wherein the relevance value indicates a probability of the endpoint of the target API being of interest for a health check according to the historical reference about instability;
determining the endpoint of the target API as being of interest for a health check using the machine learning algorithm, wherein the machine learning algorithm is trained using training APIs from the reference APIs; and
generating, based on the relevance value and the determining, an executable health check for the endpoint of the target API, wherein the executable health check comprises code extracted from a health check generation library.

* * * * *